United States Patent
Liotta et al.

(10) Patent No.: US 8,480,493 B2
(45) Date of Patent: Jul. 9, 2013

(54) ARCADE-STYLE GAME CONTROLLER FOR A TABLET COMPUTING DEVICE

(75) Inventors: Tyson Liotta, Rockville, MD (US);
Brian Shim, Providence, RI (US);
William Yonkers, Falls Church, VA (US)

(73) Assignee: inMusic Brands, Inc., Cumberland, RI (US)

( * ) Notice: Subject to any disclaimer, the term of this patent is extended or adjusted under 35 U.S.C. 154(b) by 0 days.

(21) Appl. No.: 13/346,782

(22) Filed: Jan. 10, 2012

(65) Prior Publication Data
US 2012/0108335 A1    May 3, 2012

Related U.S. Application Data (60) Provisional application No. 61/448,266, filed on Mar. 2, 2011.

(51) Int. Cl.
*A63F 13/00* (2006.01)
(52) U.S. Cl.
USPC .................................. 463/38; 463/37; 463/46
(58) Field of Classification Search
USPC .................................... 463/36, 37, 38, 47, 46
See application file for complete search history.

(56) References Cited

U.S. PATENT DOCUMENTS

| | | | | |
|---|---|---|---|---|
| 5,451,053 A | * | 9/1995 | Garrido | 463/38 |
| 6,788,528 B2 | * | 9/2004 | Enners et al. | 361/679.41 |
| 6,864,798 B2 | * | 3/2005 | Janik | 340/693.11 |
| D522,999 S | * | 6/2006 | Smith-Adams et al. | D14/191 |
| 7,316,618 B2 | * | 1/2008 | Hsu | 463/37 |
| 7,580,728 B2 | | 8/2009 | Vance et al. | |
| D618,287 S | * | 6/2010 | Biheller et al. | D21/328 |
| D662,505 S | * | 6/2012 | Mori | D14/447 |
| 2004/0195305 A1 | * | 10/2004 | Dotson | 235/145 R |
| 2006/0013411 A1 | * | 1/2006 | Lin | 381/87 |
| 2006/0280045 A1 | * | 12/2006 | Ritsher et al. | 369/30.01 |
| 2008/0019082 A1 | * | 1/2008 | Krieger et al. | 361/679 |
| 2010/0081505 A1 | | 4/2010 | Allen et al. | |
| 2012/0189156 A1 | * | 7/2012 | Leung | 381/387 |

FOREIGN PATENT DOCUMENTS

| | | |
|---|---|---|
| DE | 9311994 U1 | 10/1993 |
| EP | 1721644 A1 | 11/2006 |

OTHER PUBLICATIONS

Extended European Search report dated Mar. 14, 2013, issued in European Patent Application No. 12157749.8.
Raggy Jin, "iCade for iPad is the oldschool arcade cabinet we've always wanted," *Mobile Magazine*, Jan. 8, 2011 (4 pages).

* cited by examiner

*Primary Examiner* — James S McCellan
(74) *Attorney, Agent, or Firm* — Finnegan, Henderson, Farabow, Garrett & Dunner, LLP (57) ABSTRACT

A game controller for a tablet computing device is disclosed. The controller includes a control console. A groove on a top portion of the control console configured and arranged to capture an edge of a tablet computing device in an upright orientation. A number of controls are included on the control console for transmitting game control inputs to the tablet computing device.

16 Claims, 8 Drawing Sheets

ARCADE-STYLE GAME CONTROLLER FOR A TABLET COMPUTING DEVICE

CROSS-REFERENCE TO RELATED APPLICATION

The present patent document claims priority to earlier filed U.S. Provisional Patent Application Ser. No. 61/448,266, filed on Mar. 2, 2011, the entire contents of which are incorporated herein by reference.

BACKGROUND OF THE INVENTION

1. Field of the Invention

The present patent document relates generally to input devices for personal computing devices and more particularly to an arcade-style game controller for a tablet computing device.

2. Background of the Related Art

Tablet computing devices with touch screen interfaces, such as Apple®'s iPad brand tablet computing device, have become popular platforms for video games. However, the touch screen input is not ideal for many types of games that might require joystick, buttons with tactile feedback, track balls, and other types of arcade-style game controllers. Accordingly there is a perceived need in the industry for an improved input device for playing video games on tablet computing devices with touch screen interfaces.

SUMMARY OF THE INVENTION

The present invention provides a solution to the problems of the prior art by providing a way to have traditional arcade-style game controls for tablet computing devices.

Accordingly, an object of the present invention is the provision for a game controller for tablet computing devices that includes arcade-style game controls.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1A:
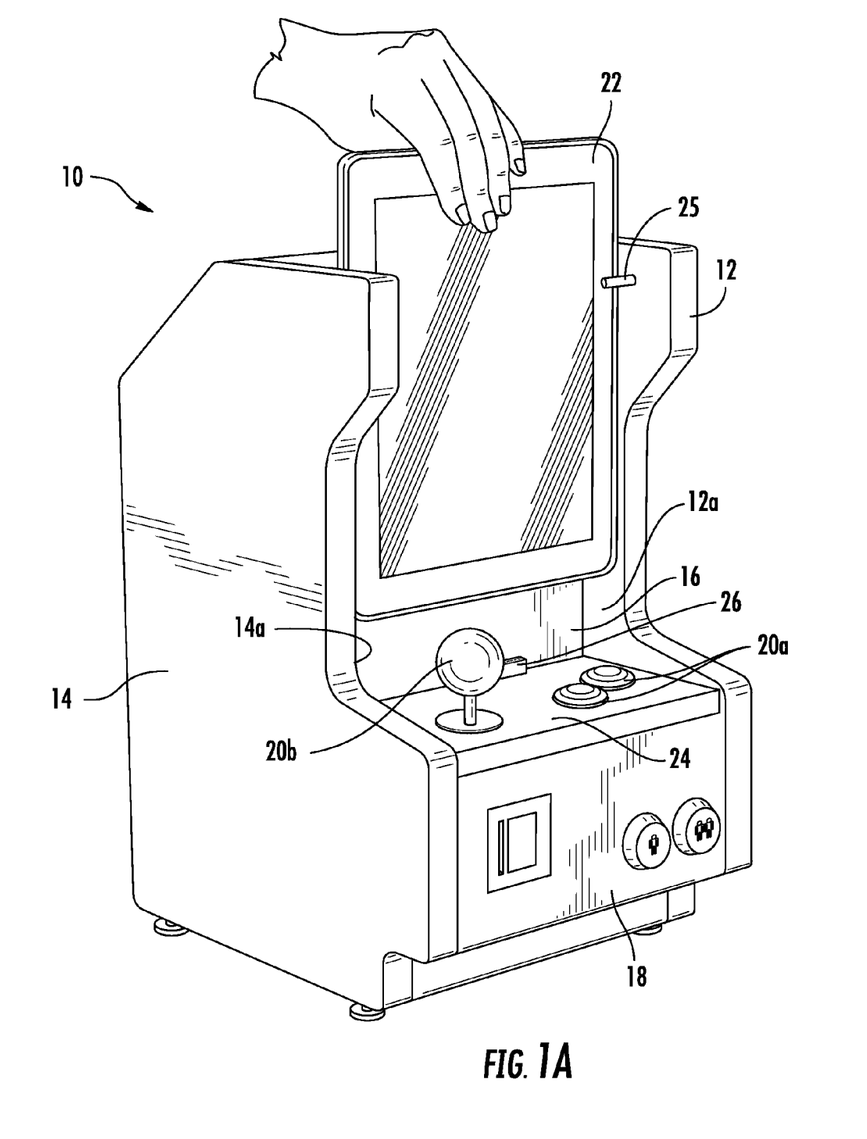
FIG. 1a is a left side perspective view of a first embodiment of the arcade-style game controller for a tablet computing device of the present invention.
Figure 1B:
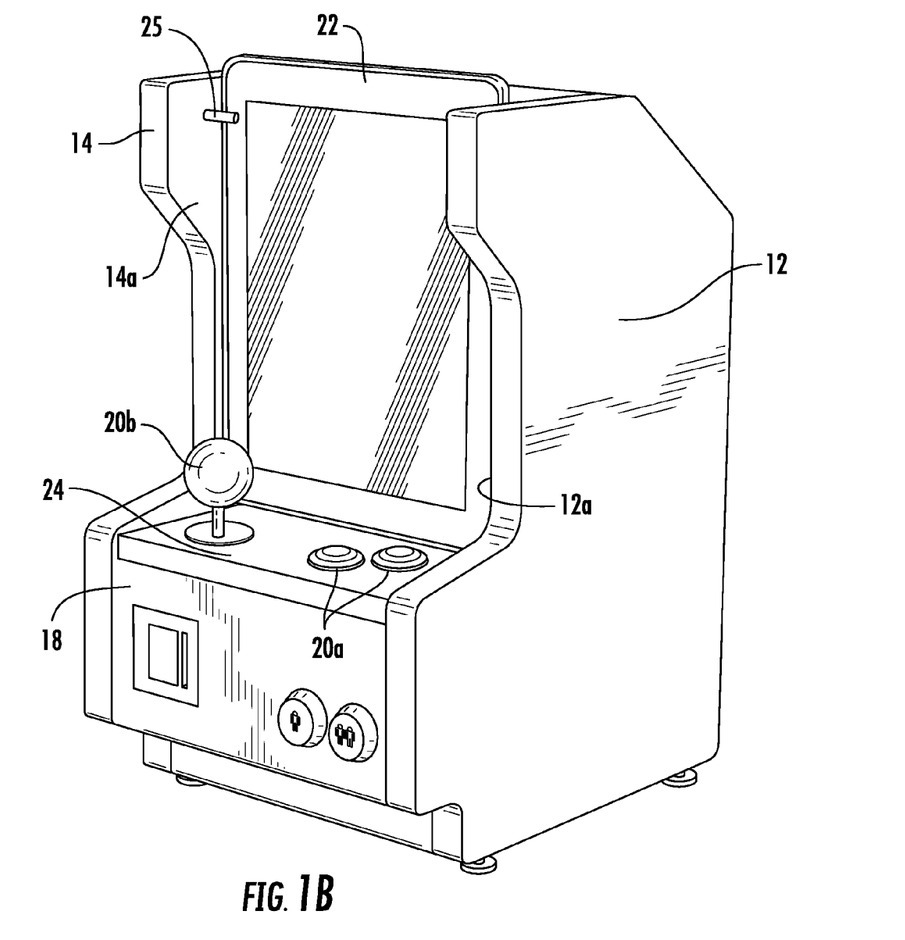
FIG. 1b is a right side perspective view of a first embodiment of the arcade-style game controller for a tablet computing device of the present invention.

Referring now to FIG. 1, a first embodiment of the game controller of the present invention is shown generally at 10. The first embodiment of the game controller 10 of the present invention includes an aesthetic cabinet with arcade-style game controls. The cabinet generally includes a left side 12, right side 14, rear, top, bottom, and front portion 16 and is sized and dimensioned to fit on top of a typical desktop. The front portion 16 further includes a control console 18 extending from the front portion 16.

The control console 18 further includes a number of game controls 20. The game controls primarily include mechanical on/off switches, which may be further configured as buttons 20a and joysticks 20b. For instance, a joystick 20b can be implemented with four switches, one for each direction (i.e., up, down, left right). An "eight" position joystick 20b may be achieved by sensing two switches "on" at the same time.

The front portion 16 of the cabinet is further configured to receive and support a tablet computing device 22. Specifically, extending forward from the left and right sides 12, 14 is a pair of spaced apart wings 12a, 14a. The wings 12a, 14a, top 24 of the control console 18 and forward portion 16 of the cabinet form a cavity sized and dimensioned to receive and hold a tablet computing device 22. Extending inwardly from the wings 12a, 14a and spaced forward from the front portion 16 is a pair of support pins 25. The support pins 25 prevent the tablet computing device 22 rom tipping forward and out of the cabinet. As seen in FIG. 1, the user may slide the tablet computing device 22 from the top of the cabinet and into the cavity.

Extending upwardly from the control console 18 is a dock connector 26 configured to connect to the tablet computing device 22. Control inputs from the game controls 20 are transmitted to the tablet computing device 22 through the dock connector 26.

In the case of an iPad brand tablet computing device 22, a direct connection from the game controller 10 to the iPad brand tablet computing device 22 is made through the dock connector 26 to the 30-pin connector of the bottom of the iPad brand tablet computing device 22. There are two variations to implement this embodiment. In the first variation, shown in FIG. 2, slow-speed serial port communication is used to do authentication and data communication of game control inputs. In the second variation, shown in FIG. 3, universal serial bus ("USB") communication is used for authentication and communication of game control inputs.

Figure 2:
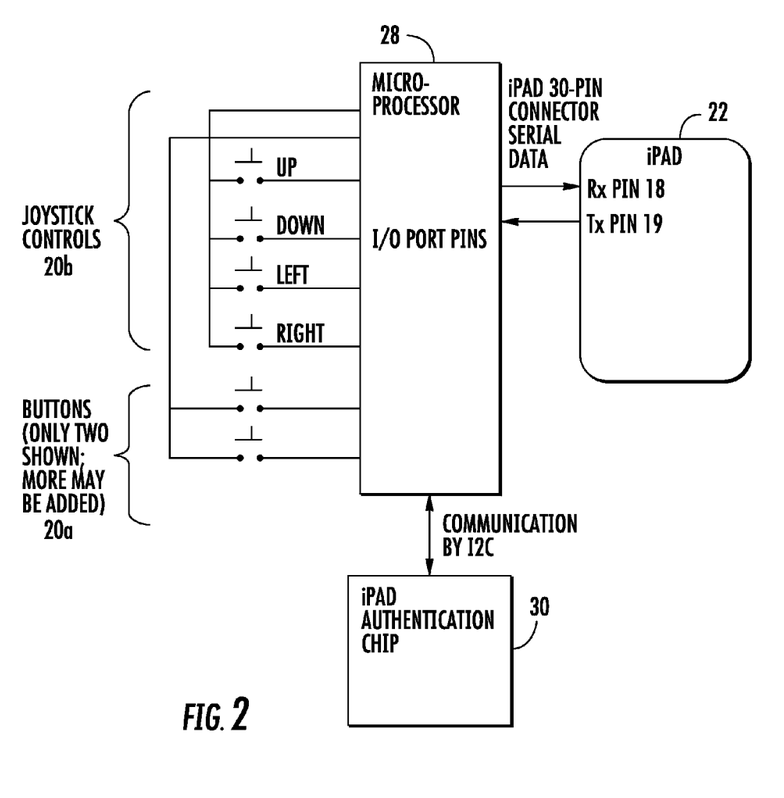
FIG. 2 is a diagram of a first variation of the operation of a first embodiment of an arcade-style game controller for a tablet computing device of the present invention using direct serial port communication of game control inputs to the tablet computing device.

Referring now to FIG. 2, a microprocessor 28 communicates with the tablet computing device 22 through a serial connector on the bottom of the tablet computing device 22, and with an authentication chip 30. The microprocessor receives authentication from the authentication chip 30 and transmits the authorization to the tablet computing device 22, which enables game control inputs to be sent and received by the iPad brand tablet computing device 22.

The game controls 20 are wired to the microprocessor 28 through the microprocessor's serial port pins. The switches of the game controls 20 can be wired in many possible arrangements of rows and columns electrically to the microprocessor 28. One possible format for sending the game control inputs is Core MIDI, where the game controls 20 would be mapped to note numbers. However, this is only one possibility. A completely custom messaging format could be used as well as described further below.

There are several ways to handle the messaging between the game controls 20 and the tablet computing device 22.

If the tablet computing device 22 is capable of interpreting the state transitions of individual keys on a keyboard, the microprocessor 28 may be configured to send key down and key up commands to the tablet computing device 22. For example, if the joystick 20b is pushed up, the microprocessor 28 generates and sends a message to the tablet computing device 22 that the switch placed in the up position on the joystick 20b was pressed (i.e., a key down command). When the joystick 20b is returned to center, the microprocessor 28 generates a message telling the tablet computing device 22 that the switch in the up position on the joystick 20b was released (i.e., a key up command).

Some tablet computing devices 22 might not be able to interpret key press transitions in this manner, or as is often the case, a particular device may not be able to interpret key up commands. Thus, another way to accomplish the messaging would be to continuously send the key press message until the game control 20 is released. In the example above with the joystick 20b deflected to the up position, the microprocessor 28 would continuously send the key press message until the joystick 20b was released. The tablet computing device 22 would continuously poll the game controller 10 to determine the state of the game controls 20.

A third way to implement the game control messaging is to send a separate key message when an event happens and another message when the event stops happening. For example, if the joystick 20b is pushed up, the microprocessor 28 would send a message informing the tablet computing devices 22 that a particular keyboard key was pressed (i.e., a key down message for a particular keyboard key). When the joystick 20b is returned to center, the microprocessor 28 would send a message informing the tablet computing device 22 that a different keyboard key was pressed (i.e., a key down message for a different keyboard key). In this manner, the tablet computing device 22 would not need to interpret when keys are released (key up messages). The tablet computing device 22 only needs to be configured to recognize key down messages.

A fourth method is to continuously send a status message which has the entire state of the all the game controls 20 of the game controller 10 encoded into it. For example, the four joystick directions and 8 buttons could be encoded into 12 bits of data, 1 meaning the joystick 20b or button 20a is activated, and 0 meaning the joystick 20b or button 20a is not activated. This message could be encoded into less than two bytes of Bluetooth data.

Any of the above methods work well for controls which can be reduced to switches (i.e., switch-type joysticks 20b and buttons 20a). However, analog type controls, such as analog joysticks, track balls, and control wheels, cannot be reduced to binary values without losing their fidelity. There are several methods to encode analog signals from these types of controls. One method is to encode the analog value to a number of keyboard keys. For example, a control wheel with 16 positions could be encoded to 16 different keyboard key press messages or even Bluetooth keyboard key press messages, as described further below, to retain the fidelity of the control wheel.

Regardless of which method is used, the video game software operating on the tablet computing device 22 must be configured to receive the messages and translate the content of the message into an input useable by the video game software.

The microprocessor 28 can be any one of many microprocessors available that include 12C serial interfaces, such as the 8051 manufactured by Intel, Inc.

Figure 3:
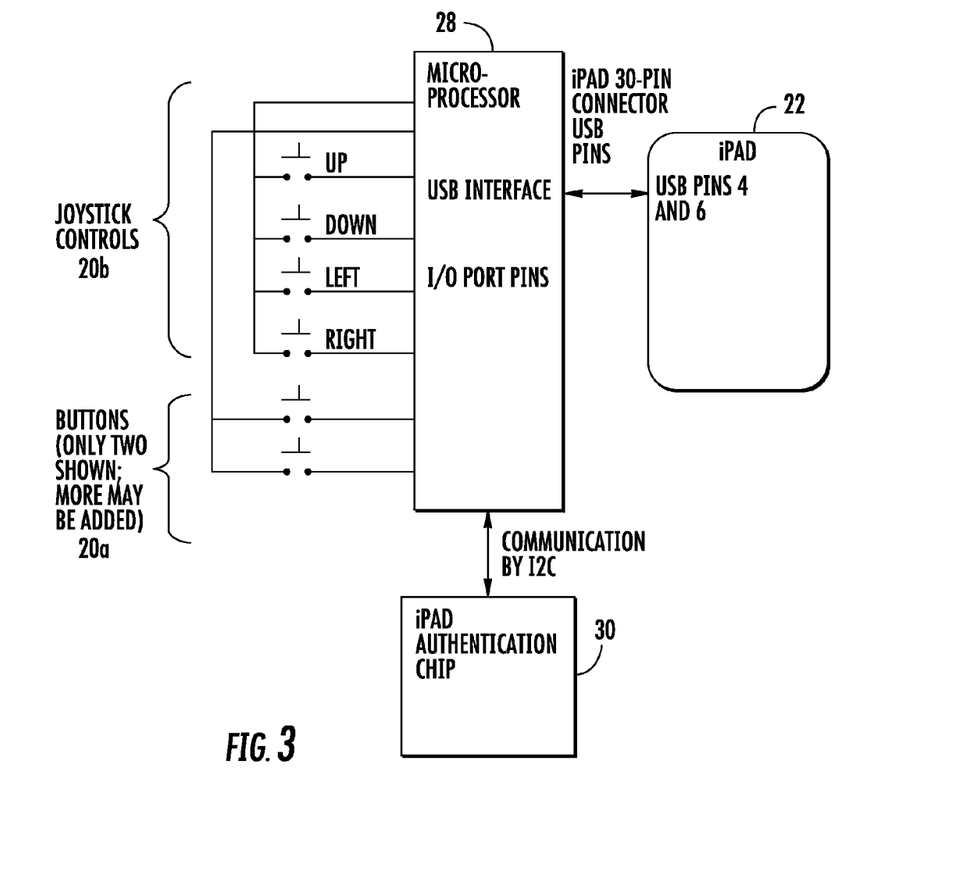
FIG. 3 is a diagram of a second variation of the operation of a first embodiment of an arcade-style game controller for a tablet computing device of the present invention using universal serial bus ("USB") communication of game control inputs to the tablet computing device.

Referring now to FIG. 3, as noted above earlier, a variation of the embodiment shown in FIG. 1 uses USB communication for authentication and communication of game control inputs to the tablet computing device 22. The microprocessor 28 can be any one of a variety of microprocessors with USB capability. One example is the STM32 microprocessor manufactured by STMicroelectronics N.V.

The microprocessor 28 communicates with the tablet computing device 22 through the universal serial bus interface on the tablet computing device 22 and an authentication chip 30. The microprocessor 28 receives authentication from the authentication chip 30 and communicates the authorization to the tablet computing device 22, which enables game control inputs to be sent and received by the tablet computing device 22.

As mentioned earlier, one possible format for sending the game control inputs is Core MIDI, in which case the game controls 20 would be mapped to note numbers. The note numbers are transmitted over USB protocol to the tablet computing device 22.

In both variations shown in FIGS. 1-3 which use a dock connector 26 to directly connect to the tablet computing device 22, electric power may be supplied to the tablet computing device 22 through the dock connector 26 to the serial connector on the tablet computing device 22 to charge a battery on the tablet computing device 22, where support for charging is provided. In addition, line out audio can be taken from the tablet computing device 22 and amplified for playback through optional onboard speakers placed in the cabinet of the game controller 10 of the present invention. These features may be authenticated by the microprocessor 28 as described above.

Figure 4:
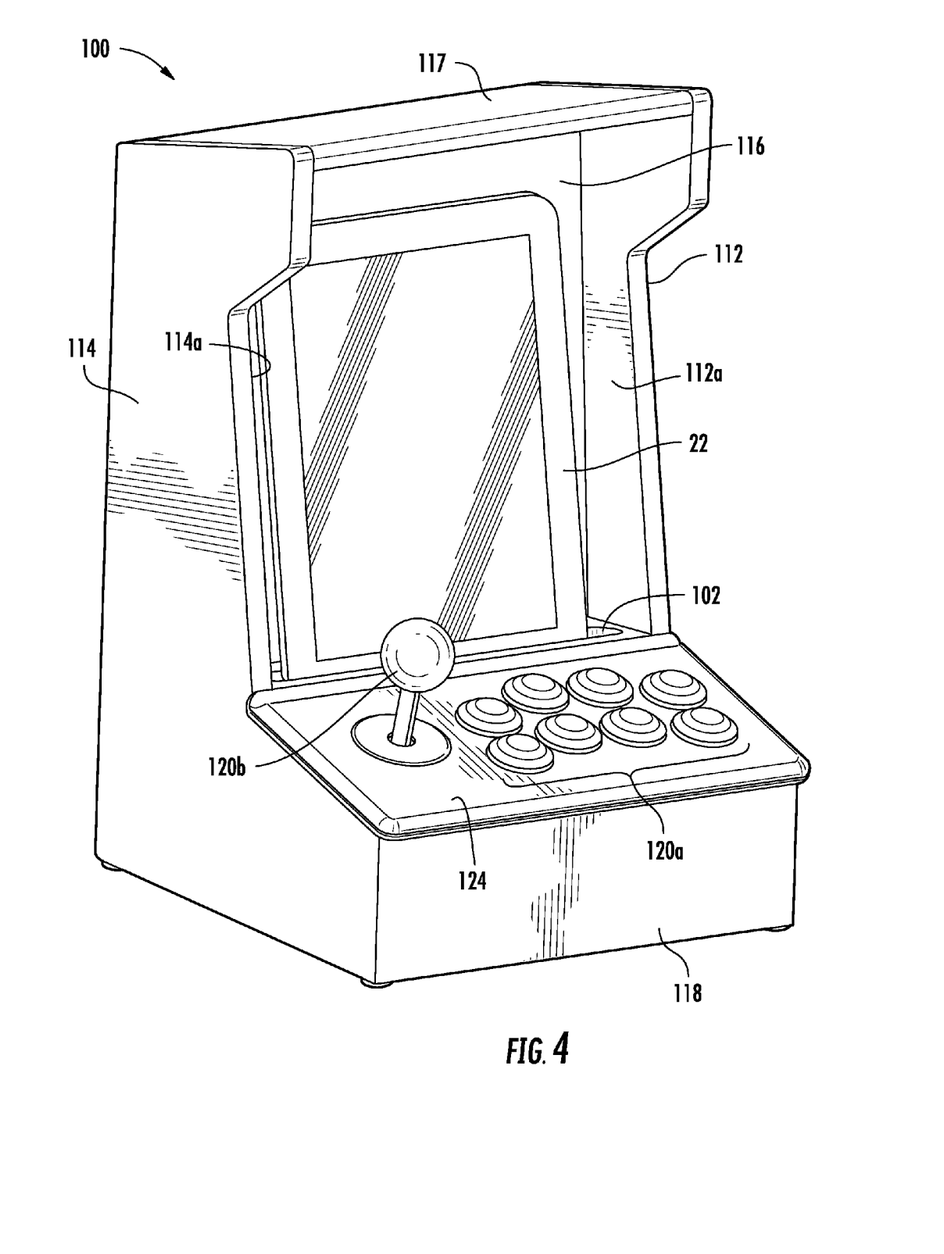
FIG. 4 is a perspective view of a second embodiment of an arcade-style game controller for a tablet computing device of the present invention.
Figure 5:
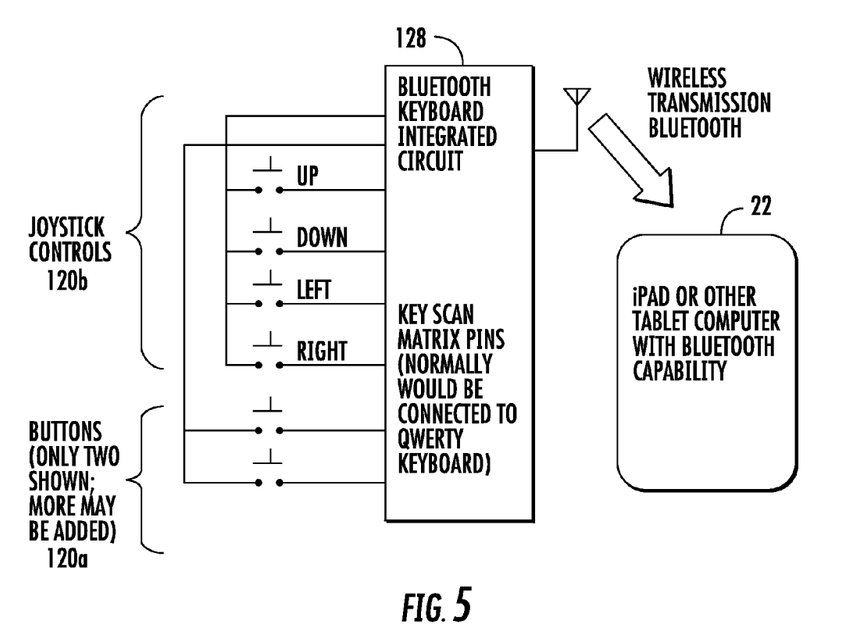
FIG. 5 is a diagram of the operation of a second embodiment of an arcade-style game controller for a tablet computing device of the present invention using wireless communication of game control inputs to the tablet computing device.

Referring now to FIGS. 4 and 5, a second embodiment of the game controller of the present invention is shown generally at 100. The second embodiment 100 of the game controller of the present invention includes a cabinet with an arcade-style appearance. The cabinet generally includes a left side 114, right side 112, rear, top 117, bottom, and front portion 116 and is sized and dimensioned to fit on top of a typical desktop. The front portion 116 further includes a control console 118 extending from the front portion 116.

The control console 118 further includes a number of game controls 120. The game controls 120 primarily include mechanical on/off switches, which may be further configured as buttons 120a and joysticks 120b. For instance, a joystick 120b can be implemented with four switches, one for each direction (i.e., up, down, left right). An "eight" position joystick may be achieved by sensing two switches "on" at the same time. As mentioned above, the game controls 120 may be encoded into any number of keyboard key press message formats by a microprocessor 128, which transmits the encoded message to the tablet computing device 22.

The front portion 116 of the cabinet is further configured to receive and support a tablet computing device 22. The top 124 of the control console 118 and forward portion 116 of the cabinet form a cavity sized and dimensioned to receive and hold a tablet computing device 22. The top 126 of the control console 118 further includes a groove 102 to receive the bottom edge of the tablet computing device 22. The forward portion 116 of the cabinet is pitched slightly rearward. When place in the cabinet, the tablet computing device 22 is stable and will not slide out because the bottom edge of the tablet computing device 22 is captured in the groove 102 on the top 126 of the control console 118 and the tablet computing device 22 is supported by the forward portion 116 of the cabinet.

The cabinet may further include right and left wings 112a, 114a extending from the right and left sides 112, 114, respectively, and connected to a portion of the top 117 extending forward from the forward portion 116 of the cabinet. The wings 112a, 114a and top 117 together form a shade to prevent excess light from causing glare on the screen of the tablet computing device 22. Furthermore, the wings 112a, 114a and top 117 are further sculpted to accentuate the arcade-style appearance of the cabinet.

The second embodiment 100 utilizes a microprocessor 128 with a Bluetooth keyboard integrated circuit to send the game control inputs wirelessly to the tablet computing device 22. Of course, this embodiment requires that the tablet computing device 22 support wireless communications and more specifically, Bluetooth wireless communication. In one variation, the switches from the game controls 120 on the control console 118 are wired into a Bluetooth keyboard switch matrix, as alluded to above in the description of the first embodiment.

All communication between the game controls 120 on the control console 118 and the tablet computing device 22 occur wirelessly without a need for a direct connection through the dock 26. One example of a microprocessor 128 with an Bluetooth integrated circuit is the BCM2042 manufactured by Broadcom, Inc.

Only two buttons 120b are shown, in FIG. 5, but more may be added as not in FIG. 5 and as shown in the embodiment in FIG. 4. As noted above, there are many ways to wire up the switch matrix. The above is shown with the joystick 120b switches on a separate column from the buttons 120a. The rows and columns can be wired up arbitrarily, as long as there are enough rows and columns to accommodate the game controls 120 (this is generally the case, since these Bluetooth enabled microprocessor chips can accommodate full-sized QWERTY keyboard layouts with many more switches). The second embodiment 100 may be powered either by battery or AC adapter.

Figure 6:
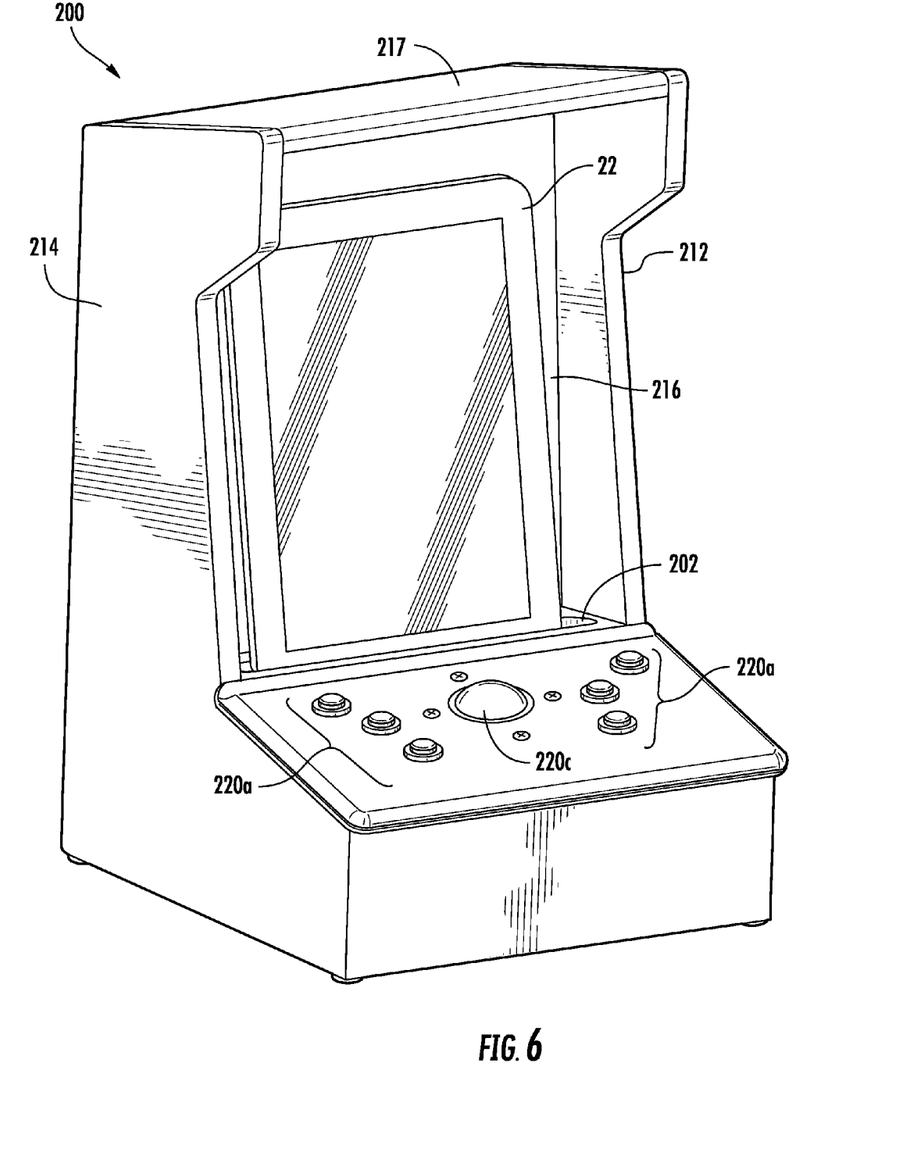
FIG. 6 is a left side perspective view of a third embodiment of an arcade-style game controller for a tablet computing device of the present invention showing the control surface with a track-ball control and buttons.
Figure 7:
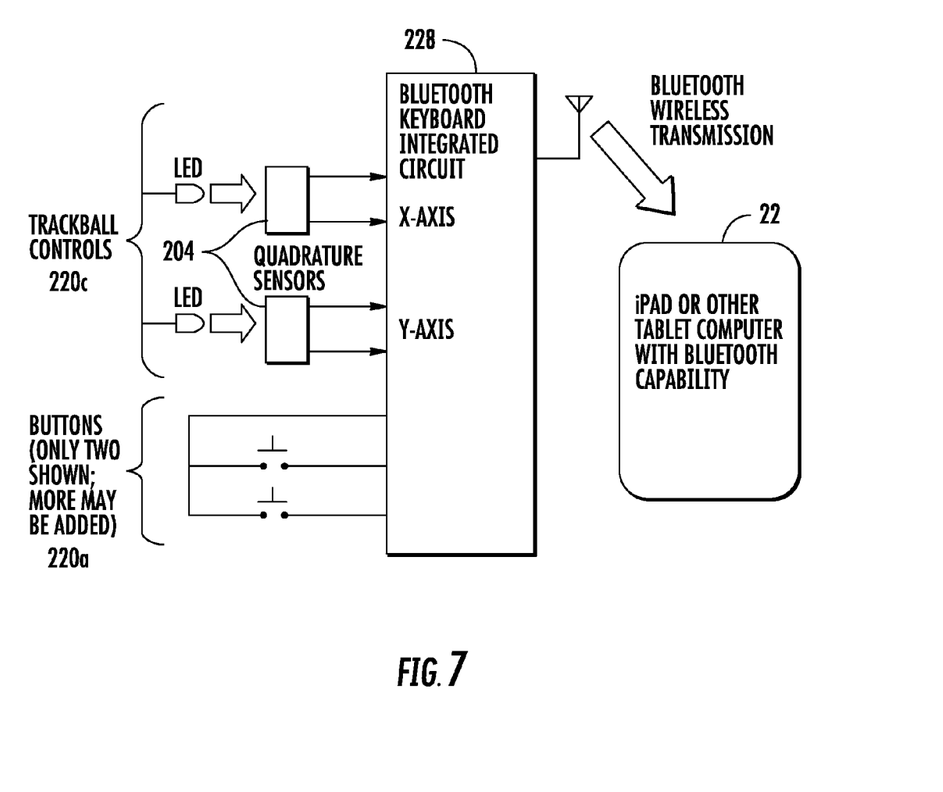
FIG. 7 is a diagram of the operation of a third embodiment of an arcade-style game controller for a tablet computing device of the present invention.

Referring now to FIGS. 6 and 7, show a third embodiment 200 of the game controller of the present invention that implements a trackball control 220c. The third embodiment 200 also include an arcade-style cabinet that includes left 214 and right 212 sides, top 217, bottom and forward portions 216, a control console 218 with a top 224 for game controls 220, and a groove 202 to capture the tablet computing device 22, like the earlier embodiments described above.

As mentioned earlier, encoding an analog input device such as a trackball 220c must be converted into a digital format suitable for transmission to a tablet computing device 22. One method of converting the trackball 220c movements is using a microprocessor 228 with a Bluetooth integrated circuit, such as a Broadcom BCM2042. The Broadcom BCM2042, like many microprocessors 228 with Bluetooth integrated circuits, also includes quadrature inputs 204 to accommodate a ball encoder, which is usually for use in a mechanical mouse. However, the quadrature inputs 204 can be inverted and re-sized to provide a track ball control surface. A track ball control 220c is used in arcade games like "Centipede", "Millipede", and "Missile Command" games created by Atari Inc. that are now considered arcade classics.

Therefore, it can be seen that the present invention provides a unique solution to the problem of providing an improved input device for playing video games on tablet computing devices with touch screen interfaces.

It would be appreciated by those skilled in the art that various changes and modifications can be made to the illustrated embodiments without departing from the spirit of the present invention. All such modifications and changes are intended to be within the scope of the present invention.

What is claimed is:

1. A game controller for a tablet computing device, comprising:
   a control console;
   a groove on a top portion of the control console configured to capture an edge of a tablet computing device in an angled orientation;
   an arcade-style cabinet housing the tablet device when placed into the groove, and comprising a support portion configured to support the tablet device in the angled orientation; and
   a plurality of controls on said control console configured to transmit game control inputs to said tablet computing device.

2. The game controller of claim 1, wherein the edge of the tablet computing device is captured in a portrait orientation when placed in the groove.

3. The game controller of claim 1, further comprising a dock connector configured to connect to the tablet computing device when placed on the top portion of the control console, said dock connector configured to carry game control inputs to the tablet computing device.

4. The game controller of claim 1, wherein the plurality of controls comprises at least one of: a trackball, a joystick or a button.

5. The game controller of claim 1, further comprising a wireless adapter configured to transmit game control inputs to the tablet computing device from the plurality of controls.

6. The game controller of claim 1,
   wherein the support portion is positioned to the rear of the tablet device when the device is placed in the groove, and
   wherein the cabinet further comprises:
   a left side and a right side extending upwards from the control console, the left side and right side having a pair of wings extending forwardly from the support portion to form a cavity about the tablet computing device when the device is placed in the groove.

7. The game controller of claim 6, further comprising a pair of support pins extending inwardly from the pair of wings.

8. The game controller of claim 6, further comprising a top supported by the left and right sides.

9. A game controller for a tablet computing device, comprising:
   a control console;
   a dock connector supported on the control console, and configured to connect to a tablet computing device;
   a microprocessor connected to the dock connector;
   a plurality of game controls on the control console, the controls being connected to the microprocessor; and
   an arcade-style cabinet housing the tablet device when the tablet device is connected to the dock connector, the cabinet being configured to allow the tablet device to be lowered onto the dock connector;
   wherein the microprocessor is configured to receive game control inputs from the plurality of game controls, and to transmit the game control inputs to the tablet computing device through the dock connector.

10. The game controller of claim 9, further comprising an authentication chip connected to the microprocessor, the chip being configured to authorize the game controller with the tablet computing device.

11. The game controller of claim 9, wherein the microprocessor has a key scan matrix and the plurality of game controls are connected to the key scan matrix of the microprocessor.

12. The game controller of claim 9, wherein:
a top portion of the control console comprises a groove configured to capture an edge of the tablet computing device in an angled orientation; and
the cabinet comprises a support portion that is positioned to the rear of the tablet device when the device is placed into the groove.

13. The game controller of claim 12, wherein the orientation is additionally a portrait orientation.

14. The game controller of claim 9, wherein the plurality of controls comprises at least one of: a trackball, a joystick or a button.

15. The game controller of claim 9,
wherein the cabinet further comprises a left side and right side extending upwards from the control console, the left side and the right side having a pair of wings extending forwardly from a support portion to form a cavity about the tablet computing device when the device is placed on the dock connector.

16. The game controller of claim 15, further comprising a pair of support pins extending inwardly from the pair of wings.

* * * * *